(12) United States Patent
Gardner et al.

(10) Patent No.: US 7,144,431 B2
(45) Date of Patent: *Dec. 5, 2006

(54) TEXTILE FINISHING COMPOSITION AND METHODS FOR USING SAME

(75) Inventors: Robb Richard Gardner, Cincinnati, OH (US); William Michael Scheper, Lawrenceburg, IN (US); Mark Robert Sivik, Mason, OH (US); Victor Manuel Arredondo, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/267,244

(22) Filed: Oct. 9, 2002

(65) Prior Publication Data

US 2003/0110573 A1    Jun. 19, 2003

Related U.S. Application Data

(60) Provisional application No. 60/330,360, filed on Oct. 18, 2001.

(51) Int. Cl.
*D06M 11/68* (2006.01)
*D06M 13/282* (2006.01)
*C11D 3/36* (2006.01)
*C11D 3/37* (2006.01)
*B05D 5/00* (2006.01)

(52) U.S. Cl. .......... 8/115.6; 510/361; 510/434; 510/467; 510/476; 510/477; 427/389.9; 427/393.2

(58) Field of Classification Search .......... 510/361, 510/434, 467, 476, 477; 8/115.6; 427/389.9, 427/393.2

See application file for complete search history.

(56) References Cited

U.S. PATENT DOCUMENTS

| | | | |
|---|---|---|---|
| 2,243,765 A | 5/1941 | Morton |
| 2,243,786 A | 5/1941 | Udy |
| 2,541,457 A | 2/1951 | Beer |
| 3,215,488 A | 11/1965 | Suiter |
| 3,445,227 A | 5/1969 | Weinberger |
| 3,472,606 A | 10/1969 | Getchell et al. |
| 3,596,333 A | 8/1971 | Kyoto-shi et al. |
| 3,611,131 A | 10/1971 | Burkhart et al. |
| 3,660,013 A | 5/1972 | Payet et al. |
| 3,663,974 A | 5/1972 | Watanabe et al. |
| 3,841,832 A | 10/1974 | Swidler et al. |
| 3,886,204 A | 5/1975 | Geffers et al. |
| 3,960,482 A | 6/1976 | Payet |
| 4,032,294 A | 6/1977 | Thompson et al. |
| 4,046,707 A | 9/1977 | Smith et al. |
| 4,067,688 A | 1/1978 | Payet |
| 4,088,678 A | 5/1978 | Matt et al. |
| 4,104,022 A | 8/1978 | Payet |
| 4,108,598 A | 8/1978 | Payet |
| 4,331,797 A | 5/1982 | Martin |
| 4,336,024 A | 6/1982 | Denissenko et al. |
| 4,351,796 A | 9/1982 | Marshall |
| 4,396,390 A | 8/1983 | Hendrix et al. |
| 4,520,176 A | 5/1985 | Martin et al. |
| 4,530,874 A | 7/1985 | Hendrix et al. |
| 4,629,470 A | 12/1986 | Harper, Jr. |
| 4,743,266 A | 5/1988 | Harper, Jr. |
| 4,780,102 A | 10/1988 | Harper, Jr. |
| 4,792,619 A | 12/1988 | Berendt et al. |
| 4,820,307 A | 4/1989 | Welch et al. |
| 4,936,865 A | 6/1990 | Welch et al. |
| 4,975,209 A | 12/1990 | Welch et al. |
| 5,006,125 A | 4/1991 | Patton et al. |
| 5,018,577 A | 5/1991 | Pardue et al. |
| 5,122,158 A | 6/1992 | Kuroda et al. |
| 5,135,677 A | 8/1992 | Yamaguchi et al. |
| 5,205,836 A | 4/1993 | Hansen et al. |
| 5,221,285 A | 6/1993 | Andrews et al. |
| 5,242,463 A | 9/1993 | Blanchard et al. |
| 5,273,549 A | 12/1993 | Didier et al. |
| 5,298,634 A | 3/1994 | Connor et al. |
| 5,300,240 A | 4/1994 | Wilhelm et al. |
| 5,352,242 A | 10/1994 | Lammermann et al. |
| 5,385,680 A | 1/1995 | Didier et al. |
| 5,386,038 A | 1/1995 | Davis et al. |
| 5,496,476 A | 3/1996 | Tang et al. |
| 5,496,477 A | 3/1996 | Tang et al. |
| 5,606,105 A | 2/1997 | Davis et al. |

(Continued)

FOREIGN PATENT DOCUMENTS

EP    0354648 A2    2/1990

(Continued)

OTHER PUBLICATIONS

Yang et al., "Nonformaldehyde Durable Press Finishing of Cotton Fabrics by Combining Citric Acid with Polymers of Maleic Acid", *Textile Research Journal*, Jun. 1998, vol. 68, No. 6, U.S.A.

(Continued)

*Primary Examiner*—Brian P Mruk
(74) *Attorney, Agent, or Firm*—Brahm J. Corstanje; Kim William Zerby; Brian M. Bolam

(57) ABSTRACT

Novel textile finishing compositions for finishing textile articles are provided via the present invention. The textile finishing compositions disclosed herein comprise a cross-linking agents and a catalytic amount of an esterification agent. The cross-linking agents employed herein are selected from a number of phosphorous containing polycarboxylates. Also provided via the present invention are methods for applying the aforementioned finishing compositions to textile articles.

24 Claims, No Drawings

U.S. PATENT DOCUMENTS

| | | |
|---|---|---|
| 5,695,528 A | 12/1997 | Komori et al. |
| 5,705,475 A | 1/1998 | Tang et al. |
| 5,728,771 A | 3/1998 | Tang et al. |
| 5,755,828 A | 5/1998 | Westland |
| 5,794,207 A | 8/1998 | Walker et al. |
| 5,849,039 A | 12/1998 | Sadlowski |
| 5,866,664 A | 2/1999 | McCallum, III et al. |
| 5,882,357 A | 3/1999 | Sun et al. |
| 5,885,303 A | 3/1999 | Payet |
| 5,891,972 A | 4/1999 | Egraz et al. |
| 5,965,517 A | 10/1999 | Mooney |
| 5,998,511 A | 12/1999 | Westland et al. |
| 6,020,297 A | 2/2000 | Austin et al. |
| 6,063,884 A | 5/2000 | Egraz et al. |
| 6,071,434 A | 6/2000 | Davis et al. |
| 6,136,916 A | 10/2000 | Arkens et al. |
| 6,165,919 A | 12/2000 | Yang |
| 6,184,271 B1 | 2/2001 | Westland et al. |
| 6,184,321 B1 | 2/2001 | Egraz et al. |
| 6,277,152 B1 | 8/2001 | Kyriazis et al. |
| 6,300,259 B1 | 10/2001 | Westland et al. |
| 6,309,565 B1 | 10/2001 | Stowell et al. |
| 2001/0018542 A1 | 8/2001 | Gerle et al. |

FOREIGN PATENT DOCUMENTS

| | | |
|---|---|---|
| EP | 0354648 A3 | 2/1990 |
| EP | 0354648 B1 | 6/1994 |
| EP | 0360747 B1 | 10/1995 |
| EP | 0491391 B1 | 5/1996 |
| EP | 0564346 B1 | 1/1997 |
| EP | 0569731 B1 | 12/1998 |
| EP | 976867 * | 2/2000 |
| EP | 0976867 A1 | 2/2000 |
| EP | WO 01/51496 * | 7/2001 |
| WO | WO 96/26314 A1 | 8/1996 |
| WO | WO 98/04772 | 2/1998 |
| WO | WO 98/31867 | 7/1998 |
| WO | WO 99/49124 | 9/1999 |
| WO | WO 99/49125 | 9/1999 |
| WO | WO 01/21677 A1 | 3/2001 |
| WO | WO 01/23663 A1 | 4/2001 |
| WO | WO 01/51496 A1 | 7/2001 |

OTHER PUBLICATIONS

Zeigler et al., Silicone Based Polymer Science: A Comprehensive Source, Advances in Chemistry Series #224, 1990, pp. 754-755, American Chemical Society, Washington, D. C.

B. Vonicina, Durable Press Finishing of Cotton with Polycarboxylic Acid, Fibres & Textiles in Eastern Europe, Jan.-Mar. 1996, pp. 69-71, Europe.

Trask-Morrell et al., Evaluation of Polycarboxylic Acids as Durable Press Reactants Using Thermal and Mass Spectrometric Analyses Under Simulated Cure Conditions, Journal of Applied Polymer Science, 1999, pp. 230-234, New Orleans, LA, John Wiley & Sons, Inc.

Andrews et al., Finishing Additives in Treatment of Cotton Fabrics for Durable Press with Polycarboxylic Acids, Ind. Eng. Chem. Res., 1992, pp. 1981-1984, vol. 31, American Chemical Society.

C. M. Welch, Formaldehyde-Free DP Finishing with Polycarboxylic Acid, American Dyestuff Reporter, Sep. 1994, pp. 19-26 & 132.

Lewis et al., Durable Press Finishing Of Cotton With Polycarboxylic Acids. I. Preparation of Thiosuccinyl-s-triazine, Journal of Applied Polymer Science, 1997, pp. 1465-1474, vol. 66, John Wiley & Sons, Inc.

Lewis et al., Durable Press Finishing of Cotton with Polycarboxylic Acids. II. Ester Crosslinking of Cotton with Dithiosuccinic Acid Derivative of S-Triazine, Journal of Appli d Polymer Science, 1997, pp. 171-177, vol. 66, John Wiley & Sons, Inc.

Yang et al., Infared Spectroscopic Studies of the Nonformaldehyde Durable Press Finishing of Cotton Fabrics by Use of Polycarboxylic Acids, 1991, Journal of Applied Polymer Science, pp. 1609-1616, vol. 43, John Wiley & Sons, Inc.

Blanchard et al., Finishing with Modified Polycarboxylic Acid Systems For Dyeable Durable Press Cottons, 1991, vol. 23, pp. 25-28.

Welch et al., Curing Agents Having Low or Zero Phosphorus Content for Formaldehyde Free DP Finishing with Polycarboxylic Acids, 1993, vol. 25, pp. 25-29.

Schramm, et al, Kinetic Date for the Crosslinking Reaction of Polycarboxylic Acids with Cellulose, 1997, Institute for Textile Chemistry and Textile Physics, vol. 113, pp. 346-349.

Welch, et al, Mixed Polycarboxylic Acids and Mixed Catalyst in Formaldehyde-Free Durable Press Finishing, 1997, Textile Chemist and Colorist, vol. 29, pp. 22-27.

Trask-Morrell, et al, Thermoanalytical Study of Durable Press Reactant Levels on Cotton Fabrics, 1994, Textile Resource Journal, pp. 729-736.

* cited by examiner

TEXTILE FINISHING COMPOSITION AND METHODS FOR USING SAME

CROSS REFERENCE TO RELATED APPLICATIONS

This application claims priority under 35 U.S.C. § 119(e) to U.S. Provisional Application Ser. No. 60/330,360 filed Oct. 18, 2001.

FIELD

The present invention relates to textile finishing compositions and methods for employing the compositions. In particular, the present invention relates to new and novel cross-linking agents for producing durable press finishes on cellulosic textiles.

BACKGROUND

The frequent use and care of textile goods, such as linens, garments fabrics, etc. lead to the creation of creases or wrinkles in an otherwise crease free article. In the instance of garments, and in particular, cellulosic-based garments, the wear and care of such garments such as the laundering process impart creases and wrinkles into the garment. Consumers must then remove the wrinkle via a variety of methods not the least of which include ironing, pressing and monitored tumble-drying. Frequent or difficult creasing leads quickly to consumer dissatisfaction and complaint. In addition, many cellulosic-based textiles such as rayon lack dimensional stability in the face of domestic water based washing, leading to shrinkage of the textile goods.

Manufacturers and designers of textile goods have long sought the application of effective durable press coatings to cellulosic based textiles in order to confer on textiles the key properties of crease resistance and/or crease recovery, dimensional stability to domestic washing and easy care (minimal ironing). Durable press coatings involve the application of a coating to the surface of the textile via the use of a cross-linking agent that cross-links with the cellulose in the fibers of the textile upon the application of heat and reaction catalysts.

Traditional durable press coatings involve the use of formaldehyde or formaldehyde derivatives as the cross-linking agent. Formaldehyde cross-linking agents have long remained the industry standard due to their effectiveness and inexpensive price tag. However, they do result in several significant drawbacks, not the least of which is the degradation of the cellulose fibers due to the acid cleavage of the catalyst and the resultant loss of strength of the garment.

In an attempt to remedy the aforementioned drawbacks, the industry has long sought an effective, yet inexpensive cross-linking agent that is formaldehyde-free. The art is replete with the attempts including U.S. Pat. Nos. 5,273,549; 5,496,476; 5,496,477; 5,705,475; 5,728,771; 5,965,517, and 6,277,152 and WO 01/21677. Unfortunately, none to date has been able to match the performance and cost of the formaldehyde-based materials.

Accordingly, the need remains for an effective yet inexpensive textile finishing cross-linking agent that is free from formaldehyde or formaldehyde derivatives.

SUMMARY

The present invention is directed to a textile finishing composition comprising an aqueous composition having i) at least one cross-linking agent and ii) a catalytic amount of an esterification catalyst, where the cross-linking agent comprises at least one cross-linking adjunct selected from the group consisting of:

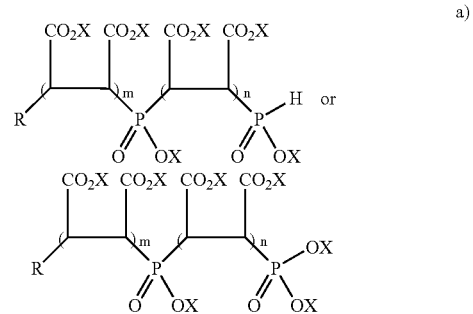

where R is H, X is H or an alkaline earth metal, m is an integer of 1 or greater and n is an integer of 1 or greater;

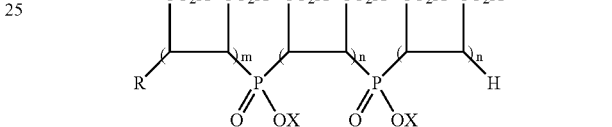

where R is H, X is H or an alkaline earth metal, m is an integer of 1 or greater and n is an integer of 1 or greater;

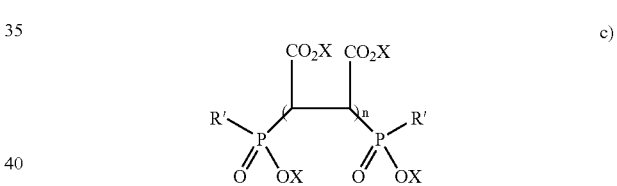

where R' is H or OH, X is H or an alkaline earth metal and n is an integer of 1 or greater;

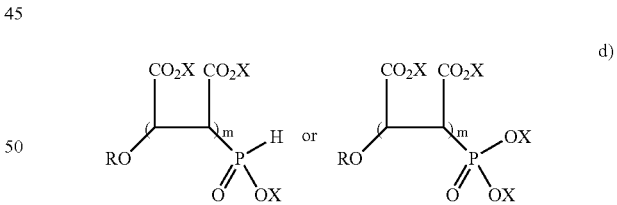

where R is H or $SO_3X$, X is H or an alkaline earth metal, m is an integer of 1 or greater and n is an integer of 1 or greater;

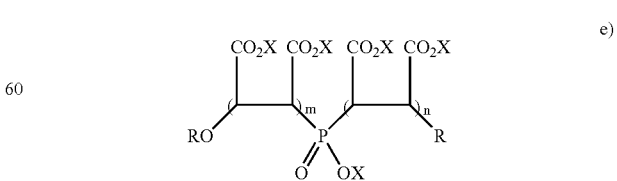

where R is H or $SO_3X$, X is H or an alkaline earth metal, m is an integer of 1 or greater and n is an integer of 1 or greater;

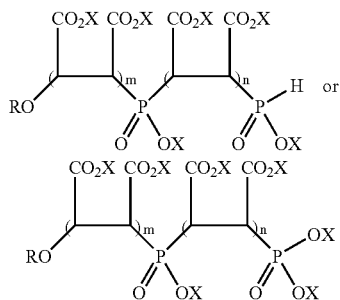

f)

where R is H or SO$_3$X, X is H or an alkaline earth metal, m is an integer of 1 or greater and n is an integer of 1 or greater;

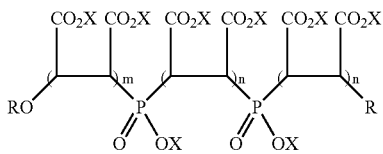

g)

where R is H or SO$_3$X, X is H or an alkaline earth metal, m is an integer of 1 or greater and n is an integer of 1 or greater; and h) mixtures thereof.

The present invention is further directed to a process for finishing a textile article, comprising the steps of 1) treating a non-finished textile component in an aqueous finishing bath containing the above cross-linking composition, and 2) curing the treated textile to form a finished textile.

These and other objects, features, and advantages will become apparent to those of ordinary skill in the art from a reading of the following detailed description and the appended claims.

DETAILED DESCRIPTION

All percentages, ratios and proportions herein are by weight, unless otherwise specified. All temperatures are in degrees Celsius (° C.) unless otherwise specified. All molecular weights are number average molecular weight and are measured using the procedure set forth in "Principles of Polymerization, 2$^{ND}$ Ed., Odian, G. Wiley-Interscience, 1981, pp 54–55 using mass spectrometry analysis. All documents cited are in relevant part, incorporated herein by reference.

The present invention meets the aforementioned needs by providing a textile finishing composition that provides superior durable press, shrinkage, and fiber strength retention properties. It has now been surprisingly discovered that the use of cross-linking agents comprising derivatives of maleic acid deliver the aforementioned superior results. In addition, it has been surprisingly discovered that the minimization of color body forming transition metals from the cross-linking composition lead to superior durable press coatings on textile goods.

The present invention provides textile finishing compositions having novel combinations of cross-linking agent(s) and catalyst(s), and methods for using the finishing compositions. The textile finishing compositions of the present invention comprises the combination of at least one cross-linking agent with an effective amount of an esterification catalyst.

I. Cross-linking Agent

The cross-linking agent of the present invention comprises a cross-linking adjunct that is a class of materials derived from maleic acid. The cross-linking adjunct of the present invention is selected from the group of formulas selected from:

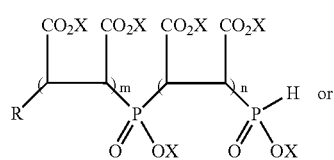

a)

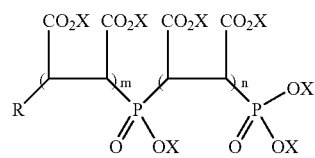

where R is H, X is H or an alkaline earth metal, m is an integer of 1 or greater and n is an integer of 1 or greater;

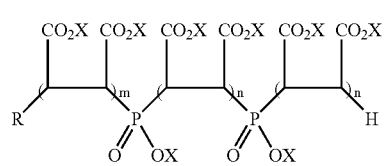

b)

where R is H, X is H or an alkaline earth metal, m is an integer of 1 or greater and n is an integer of 1 or greater;

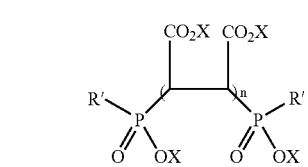

c)

where R' is H or OH, X is H or an alkaline earth metal and n is an integer of 1 or greater;

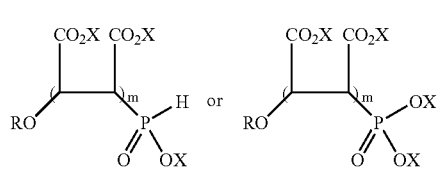

d)

where R is H or SO$_3$X, X is H or an alkaline earth metal, m is an integer of 1 or greater and n is an integer of 1 or greater;

e) 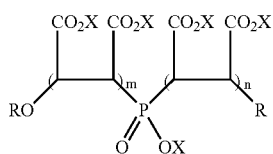

where R is H or $SO_3X$, X is H or an alkaline earth metal, m is an integer of 1 or greater and n is an integer of 1 or greater;

f) 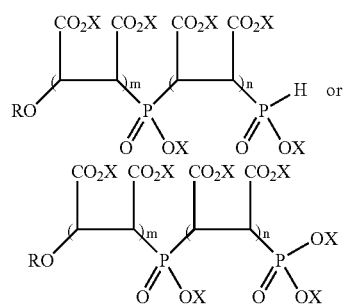

where R is H or $SO_3X$, X is H or an alkaline earth metal, m is an integer of 1 or greater and n is an integer of 1 or greater;

g) 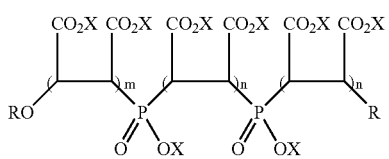

where R is H or $SO_3X$, X is H or an alkaline earth metal, m is an integer of 1 or greater and n is an integer of 1 or greater; and h) mixtures thereof.

Preferably, the cross-linking agent comprises at least about 20 molar % of the cross-linking adjunct.

Preferably, the crosslinking agent has an average molecular weight of less than about 2000, more preferably from about 300 to about 1000.

II. Esterification Catalyst

In another embodiment, the finishing compositions of the present invention further include, in addition to the aforementioned cross-linking agent, an esterification catalyst to facilitate the cross-linking by the cross-linking agents of the present invention with reactive sites on the textile articles that are treated in the finishing baths described herein, for example cellulose in the fibers of cellulosic containing textile articles. The esterification catalyst per the present invention may be selected from a wide variety of materials such as carbodiimides, hydroxy acids, mineral acids, Lewis acids, and phosphorous oxyacids. Catalyst that may be employed include, by way of example, cyanamide, guanidine or a salt thereof, dicyandiamide, urea, dimethylurea or thiourea, alkali metal salts of hypophosphorus, phosphorus or phosphoric acid, mineral acids, organic acids and salts thereof; more preferably sodium hypophosphite, hypophosphorous acid, and sodium phosphate.

Preferred catalysts include cyanamide, dicyanamide, urea, dimethylurea, sodium hypophosphite, phosphorous acid, sodium phosphate, and mixtures thereof. The fabric is typically treated with an amount of catalyst sufficient to catalyze cross-linking of the natural fibers to provide a durable press treatment and/or reduced shrinkage, for example reduced shrinkage upon aqueous laundering. In one embodiment, the catalyst may be employed in an amount sufficient to provide a cross-linking agent:catalyst weight ratio of from about 0.05 to 75 about, and preferably from about 1 to about 60.

III. Additional Crosslinking Agents

In another embodiment of the present invention, the textile finishing composition further includes an additional crosslinking agent. Examples of such an additional crosslinking agent include non-phosphorous polycarboxylic acids, carboxylic acids, and mixtures thereof.

A. Non-phosphorous Containing Polycarboxylic Acids

In one embodiment, the additional crosslinking agent is a non-phosphorous containing polycarboxylic acids which is not intentionally added but is an artifact of the process to produce low molecular weight polymaleates. Acids or their salts that may occur in the composition include but are not limited to malic acid, oxydisuccinic acid, succinic acid, butantetracarboxylic acid and maleic acid. Preferred acids that may provide a benefit are oxydisuccinic acid and butanetetracarboxylic acid. Additionally, sulfate salts and sulfate adducts of maleic acid containing polymers may also be present in the product mixture.

In a preferred embodiment, the additional crosslinking agent is 1,2,3,4-butanetetracarboyxlic acid (BTCA). Preferably the BTCA accounts for from about 0.1 to about 75% of the total cross-linking agent applied to the fabric, preferably from about 0.1 to about 50%, more preferably from about 0.1 to about 25%. BTCA may be purposefully added to generate the combinations and/or the BTCA could be an inherent by-product produced during the synthesis of the cross-linked polymers and copolymers of the present invention.

B. Carboxylic Acids

In another embodiment, the additional crosslinking agent is a conventional carboxylic acid and/or salt of carboxylic acid cross-linking agent. Such conventional carboxylic acid/salts cross-linkers may be selected from butane tetracarboxylic acid, oxy-disuccinate, imino-disuccinate, thiodisuccinate, tricarbalic acid, citric acid, 1,2,3,4,5,6-cyclohexanehexacarboxylic acid, 1,2,3,4-cyclobutanetetracarboxylic acid and mellitic acid. These conventional cross-linkers are preferably added at levels of from about 0.5% to about 75% of the finishing compositions of the present invention.

IV. Finishing Bath

Under preferred conditions of the present invention, the cross-linking agent comprises from about 5% to about 95% of the cross-linking adjunct, and preferably from about 20% to about 50%, while the finishing bath employed within the process of the present invention comprises from about 1% to about 50%, more preferably 5% to about 25% of the cross-linking agent described herein.

The finishing bath compositions of the present invention typically is maintained at a pH of from about 1 to about 7, and more preferably from about 1.5 to about 3.5, more preferably from about 1.5 to about 3; and may optionally include additional ingredients to enhance the characteristics of the final finished textile. Such ingredients are typically selected from wetting agents, brighteners, softening agents, stain repellant agents, color enhancing agents, anti-abrasion additives, water repellency agents, UV absorbing agents and fire retarding agents.

A. Wetting Agents

Wetting agents are well known in the field of textile finishing and are typically nonionic surfactants and in particular ethoxylated nonylphenols.

B. Softening Agents

Softening agents are well known in the art and are typically selected from silicones (including the reactive, amino, and silicone-copolyols as well as PDMS), hydrocarbons (including polyethylenes) such as MYKON HD®, polydimethylsiloxanes (curable and non-curable), aminosilicones (curable and non-curable), silicone copolyols (curable and non-curable), fatty acids, quaternary ammonium fatty acid esters/amides, fatty alcohols/ethers, surfactants, and polyethers (including PEG, PPG, PBG). Commercially available materials include SOLUSOFT WA®, SANDOPERM MEW®, CERAPERM MW®, DILASOFT RS® all available from Clariant, FREESOFT® 25, 100, 425, 970, PE-207, -BNN and 10M, all available from BF Goodrich as well as various other materials.

C. Dye Fixing Agents

Dye fixing agents, or "fixatives", are well known, commercially available materials which are designed to improve the appearance of dyed fabrics by minimizing the loss of dye from fabrics due to washing. Not included within this definition are components that can in some embodiments serve as fabric softeners actives.

Many dye fixing agents useful in the present invention are cationic, and are based on quaternized nitrogen compound or on nitrogen compounds having a strong cationic charge which is formed in situ under the conditions of usage. Cationic fixatives are available under various trade names from several suppliers. Representative examples include: FREETEX® 685, available from BF Goodrich; SEDGEFIX™ FB, available from OMNOVA Solutions; Rewin MRT, available from CHT-Beitlich; CARTAFIX® CB, CARTAFIX® SWE, and CASSOFIX® FRN, available from Clariant. A preferred dye fixative for use in the present invention has a Dye Fixing Parameter, as determined by the Dye Fixing Parameter Test, of greater than about 70; preferably greater than about 80; more preferably greater than about 85; and more preferably greater than about 90. Additional non-limiting examples include TINOFIX® ECO, TINOFIX® FRD and SOLFIX® E, available from Ciba-Geigy; LEVOGEN® FSE available from Bayer; Cekafix HSN and Cekafix MLA, available from Cekal Specialties. A preferred dye-fixing agent for use in the compositions of the present invention is Sandofix TP, available from Sandoz.

Other cationic dye fixing agents useful in the present invention are described in "Aftertreatments for Improving the Fastness of Dyes on Textile Fibres", Christopher C. Cook, Rev. Prog. Coloration, Vol. XII, (1982). The dye fixative may be applied prior to or simultaneously to the polymaleate finish.

To evaluate a dye fixative, prepare a 10 ppm solution of dye fixative in water. Add 800 ml of this solution to a 1000 ml beaker. Introduce 8 g+/−50 mg of C110 fabric (C110 is a poplin fabric dyed with direct black 112 and supplied by Empirical Manufacturing Company of Cincinnati, Ohio, USA) swatch in the solution such that it is completely immersed in the liquid. Agitate the solution gently with a magnetic stirrer for 120 minutes. A portion of the dye from the fabric will slowly bleed in the water. After 120 minutes, withdraw and aliquot of the liquor, place it in a 5 cm path length cell and measure its absorbance at wavelength of 600 nm with Hewlett Packard 845X uv-vis spectrophotometer following the general instructions provided by the manufacturer for the use of the instrument. This absorbance is called $Abs_{Polymer}$. Using the procedure just outlined, repeat the procedure with distilled water alone with no added dye fixative to obtain $Abs_{Water}$.

The Dye Fixing Parameter is defined as $((Abs_{Water} - Abs_{Polymer})*100)/Abs_{Water}$ D. Chlorine Scavengers Chlorine is used in many parts of the world to sanitize water. To make sure that the water is safe, a small amount, typically about 1 to 2 ppm of chlorine is left in the water. It has been found that this small amount of chlorine in tap water can cause fading of some fabric dyes. Chlorine scavengers are actives that react with chlorine, or with chlorine-generating materials, such as hypochlorite, to eliminate or reduce the bleaching activity of the chlorine materials. In a preferred embodiment, a fabric substantive chlorine scavenger is incorporated at the textile mill, preferably in the finishing bath. Better distribution and protection is achieved herein by spreading the chlorine scavenger over the fabric more evenly.

Chlorine scavengers can be selected from the group consisting of: amines and their salts; ammonium salts; amino acids and their salts; polyamino acids and their salts; polyethyleneimines and their salts; polyamines and their salts; polyamineamides and their salts; polyacrylamides; and mixtures thereof.

The amount of chlorine scavenger in the fabric is sufficient to react with about 0.1 ppm to about 50 ppm of chlorine present in an average wash liquor; preferably from about 0.2 ppm to about 20 ppm; and more preferably from about 0.3 ppm to about 10 ppm. Generally the fabric is treated with at least from about 0.1% to about 8% based on the weight of the fabric; more preferably from about 0.5% to about 4%; more preferably from about 1% to about 2%.

Non-limiting examples of chlorine scavengers useful in the present invention include amines, preferably primary and secondary amines, including primary and secondary fatty amines, and alkanolamines; salts of such amines; amine-functional polymers and their salts; amino acid homopolymers with amino groups and their salts, such as polyarginine, polylysine, polyhistidine; and amino acid copolymers with amino groups and their salts.

Preferred polymers useful in the present invention are polyethyleneimines, the polyamines, including di(higher alkyl)cyclic amines and their condensation products, polyamineamides, and their salts, and mixtures thereof. A representative example includes: Chromoset CBF, available from Cognis. A preferred chlorine bleach protective agent for use in the compositions of the present invention is Cekafix PRE, available from Cekal Specialties.

E. Stain Repellency Agents

Stain repellency agents useful in the present invention are also well known in the art and are typically selected from fluoropolymers (including fluoroacrylates), fluoroalcohols, fluoroethers, fluorosurfactants, anionic polymers (e.g., polyacrylic acid, polyacids/sulfonates, etc), polyethers (such as PEG), hydrophilic polymers (—such as polyamides, polyesters, polyvinyl alcohol) and hydrophobic polymers (e.g., silicones, hydrocarbons, and acrylates). Commercially available materials include ZONYL® 7040, 8300 and 8787 from Du Pont Chemcials, SCOTCHGUARD™ from 3M, REPEARL® F31-X, F-3700, F-35 and F-330 available from Asahi and SEQUAPEL SF® from OMNOVA Solutions as well as various other materials.

F. Anti Abrasion Additives

Anti abrasion additives useful in the present invention are also well known in the art and are typically selected from polymers such as polyacrylates, polyurethanes, polyacrylamides, polyamides, polyvinyl alcohol, polyethylene waxes, polyethylene emulsions, polyethylene glycol, starches/polysaccharides (both unfunctionalized and functionalized, e.g., esterified) and anhydride-functional silicones. Commercially available materials are selected from VELUSTRO® available from Clariant; SUNCRYL CP-75® and DICRYLAN® from Ciba Chemicals; as well as various other materials.

G. Antibacterial Agents

Antibacterial agents useful in the present invention, are well known in the art and are typically selected from quaternary ammonium containing materials such as BARDAC/BARQUAT® from Lonza, quaternary silanes such as DC5700® from Dow Corning, polyhexamethylene biguanide available from Zeneca, halamines from Halosource, chitosan, and derivatives thereof, as well as various other materials.

H. Hydrophilic Finishes

Hydrophilic finishes for water absorbency useful in the present invention are also well known in the art and are typically selected from PEG, surfactants (e.g. anionic, cationic, nonionic, silicone copolyols), anionic polymers (polyacrylic acid, polyvinylalcohol) and reactive anionics. Hydrophobic finishes for water repellency are typically selected from silicones (reactive, amino, PDMS, silicone-copolyols, copolymers), hydrocarbons (polyethylenes), fatty acids, quaternary ammonium fatty acid esters/amides, fatty alcohols/ethers and surfactants (with sufficient HLB). UV Protection agents are typically selected from UV absorbers and anti-oxidants.

I. Brighteners

Brightener components useful in the present invention include one or more optical brighteners or whiteners. Typically, the terms "optical brighteners" and "whiteners" are used interchangeably and are taken to mean organic compounds that absorb the invisible ultraviolet (UV) portion of the daylight spectrum and convert this energy into the longer-wavelength visible portion of the spectra.

Commercial optical brighteners include, but are not necessarily limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Examples of such brighteners are disclosed in "The Production and Application of Fluorescent Brightening Agents," M. Zahradnik, published by John Wiley & Sons, New York (1982).

Examples of optical brighteners useful in the present invention are those identified in the Wixon U.S. Pat. No. 4,790,856. These brighteners include the PHORWHITE series of brighteners from Verona. Other brighteners disclosed in this reference include: Tinopal UNPA, Tinopal CBS and Tinopal 5BM; available from Ciba-Geigy; Arctic White CC and Arctic White CWD, the 2-(4-styryl-phenyl)-2H-naptho[1,2-d]triazoles; 4,4'-bis-(1,2,3-triazol-2-yl)-stilbenes; 4,4'-bis(styryl)bisphenyls; and the amino-coumarins. Specific examples of these brighteners include 4-methyl-7-diethyl-amino coumarin; 1,2-bis(benzimidazol-2-yl)ethylene; 1,3-diphenyl-pyrazolines; 2,5-bis(benzoxazol-2-yl) thiophene; 2-styryl-naphth[1,2-d]oxazole; and 2-(stilben-4-yl)-2H-naptho[1,2-d]triazole. Additional known brighteners are disclosed in the Hamilton U.S. Pat. No. 3,646,015.

J. Minimization of Color Body Forming Transition Metals

In addition, it has been surprisingly discovered that superior clarity and color of the resultant durable press coating is achieved via the minimization of color body forming transition metals in the crosslinking adjuncts composition or in the finishing bath compositions of the present invention. Color body forming transition metals are those metals which form colored metal materials in the finishing bath such as oxides which in turn deposit on the treated fabrics resulting in a disturbing lack of color and clarity. Thus, it is a preferred aspect of the present invention in that the finishing bath composition is substantially free of these color body forming transition metals. By the phrase "substantially free" it is intended that the finishing bath has less than about 100 ppm, more preferably less than about 10 ppm, more preferably less than about 3 ppm of the aforementioned transition metals. Typical transition metals include those selected from the group consisting of iron, copper, manganese, cobalt and mixtures thereof.

V. Textiles/Fabrics

For the purposes of the process of the present invention, textile articles may be treated in the finishing baths of the present invention followed by curing and drying to facilitate the cross-linking of the cross-linking agent on the textile treated. The textile articles are treated herein are typically fabrics which preferably comprise natural fibers. Herein, "individual fiber" refers to a short and/or thin filament, such as short filaments of cotton as obtained from the cotton boll, short filaments of wool as sheared from the sheep, filaments of cellulose or rayon, or the thin filaments of silk obtained from a silkworm cocoon. Herein, "fibers" is intended to include filaments in any form, including individual filaments, and the filaments present in formed yarns, fabrics and garments.

Herein, "yarn" refers to a product obtained when fibers are aligned. Yarns are products of substantial length and relatively small cross-section. Yarns may be single ply yarns, that is, having one yarn strand, or multiple ply yarns, such as 2-ply yarn that comprises two single yarns twisted together or 3-ply yarn that comprises three yarn strands twisted together. Herein, "fabrics" generally refer to knitted fabrics, woven fabrics, or non-woven fabrics prepared from yarns or individual fibers, while "garments" generally refer to wearable articles comprising fabrics, including, but not limited to, shirts, blouses, dresses, pants, sweaters and coats. Non-woven fabrics include fabrics such as felt and are composed of a web or batt of fibers bonded by the application of heat and/or pressure and/or entanglement. Herein, "textiles" includes fabrics, yarns, and articles comprising fabrics and/or yarns, such as garments, home goods, including, but not limited to, bed and table linens, draperies and curtains, and upholsteries, and the like.

Herein, "natural fibers" refer to fibers which are obtained from natural sources, such as cellulosic fibers and protein fibers, or which are formed by the regeneration of or processing of natural occurring fibers and/or products. Natural fibers are not intended to include fibers formed from petroleum products. Natural fibers include fibers formed from cellulose, such as cotton fiber and regenerated cellulose fiber, commonly referred to as rayon, or acetate fiber derived by reacting cellulose with acetic acid and acetic anhydride in the presence of sulfuric acid. Herein, "natural fibers" are intended to include natural fibers in any form, including individual filaments, and fibers present in yarns, fabrics and other textiles, while "individual natural fibers" is intended to refer to individual natural filaments.

Herein, "cellulosic fibers" are intended to refer to fibers comprising cellulose, and include, but are not limited to, cotton, linen, flax, rayon, cellulose acetate, cellulose triacetate, hemp and ramie fibers. Herein, "rayon fibers" is intended to include, but is not limited to, fibers comprising viscose rayon, high wet modulus rayon, cuprammonium rayon, saponified rayon, modal rayon and lyocell rayon. Herein, "protein fibers" are intended to refer to fibers comprising proteins, and include, but are not limited to, wools, such as sheep wool, alpaca, vicuna, mohair, cashmere, guanaco, camel and llama, as well as furs, suedes, and silks.

Herein, "synthetic fibers" refer to those fibers that are not prepared from naturally occurring filaments and include, but are not limited to, fibers formed of synthetic materials such as polyesters, polyamides such as nylons, polyacrylics, and polyurethanes such as spandex. Synthetic fibers include fibers formed from petroleum products.

Fabrics for use in the present invention preferably comprise natural fibers, which natural fibers may be included in any form, including, but not limited to, in the form of individual fibers (for example in nonwoven fabrics), or in the form of yarns comprising natural fibers, woven or knitted to provide the fabrics. Additionally, the fabrics may be in the form of garments or other textiles comprising natural fibers. The fabrics may further comprise synthetic fibers. Preferably, the fabrics comprise at least about 20% natural fibers. In one embodiment, the fabrics comprise at least about 50% natural fibers such as cotton fibers, rayon fibers or the like. In another embodiment, the fabrics comprise at least about 80% natural fibers such as cotton fibers, rayon fibers or the like, and in a further embodiment, the fibers comprise 100% natural fibers. Fabrics comprising cellulose fibers such as cotton and/or rayon are preferred for use in the present invention.

Preferred fabrics for use in the present invention are blends of cotton fibers with other fibers, preferably rayon and synthetic fibers. Preferred blends include 50/50 cotton/rayon, 60/40 cotton/rayon, 50/50 cotton/synthetic, 65/35 cotton/synthetic, 50/50 rayon/synthetic, 60/40 cotton/synthetic, 65/35 rayon/wool, 85/15 rayon/flax, 50/50 rayon/acetate, cotton/spandex, rayon/spandex, and combinations thereof.

Also preferred by the present invention are woven and knit fabrics (including blends with synthetic fibers) constructed from "high quality" cottons. Herein, "high quality" cottons are defined as those with preferred fiber properties such as 1) staple lengths greater than 2.65 cm; 2) breaking strengths greater than 25 gms/tex; and 3) micronaire greater than 3.5.

One embodiment of "high quality" cottons includes those derived via genetic modification with the intent of producing cotton with preferred properties. Examples of genetic modification for delivery of cotton with preferred fiber properties are discussed in the following references: *Cotton Fibers—Developmental Biology, Quality Improvement, and Textile Processing*, Amarjit S. Basra, Food Products Press, Binghamton, N.Y., 1999; "Quality Improvement in Upland Cotton" May, O. Lloyd, et al., Journal of Crop Production 2002 5(½), pp. 371; "Future Demands on Cotton Fiber Quality in the Textile Industry: Technology—Quality—Cost", Faerber, C., Proc. Beltwide Cotton Production Research Conference 1995, National Cotton Council, pp. 1449; and references therein.

Cotton fiber lengths are classified as either short staple (up to 1 inch; 2.5 cm), medium staple (1$\frac{1}{32}$ to 1$\frac{3}{32}$ inch; 2.63–2.78 cm), or long staple (over 1⅛ inch; over 2.86 cm). Instruments such as a fibrograph and HVI (high volume instrumentation) systems are used to measure the length of the fiber. HVI instruments compute length in terms of "mean" and "upper half mean" (UHM) length. The mean is the average length of all the fibers while UHM is the average length of the longer half of the fiber distribution.

Fiber strength is usually defined as the force required to break a bundle of fibers or a single fiber. In HVI testing the breaking force is converted to "grams force per tex unit." This is the force required to break a bundle of fibers that is one tex unit in size. In HVI testing the strength is given in grams per tex units (grams/tex). Fibers can be classified as 1) low strength, 19–22 gms/tex; 2) average strength, 23–25 gms/tex; 3) high strength, 26–28 gms/tex; and 4) very high strength, 29–36 gms/tex.

The micronaire reading of fiber is obtained from a porous-air flow test. The test is conducted as follows according to the method ASTM D1448-97. A weighed sample of cotton is compressed to a given volume and a controlled air flow is passed through the sample. The resistance to the air flow is read as micronaire units. The micronaire readings reflect a combination of maturity and fineness. Since the fiber diameter of fibers within a given variety of cotton is fairly consistent, the micronaire index will more likely indicate maturity variation rather than variations in fineness. A micronaire reading of from about 2.6 to about 2.9 is low while from about 3.0 to about 3.4 is below average, from about 3.5 to about 4.9 is average, and from about 5.0 and up is high. For most textile applications a micronaire of from about 3.5 to about 4.9 is used. Anything higher than this is generally not preferred. Of course, different applications require different fiber properties. A fiber property that is disadvantageous in one application might be advantageous in another.

VI. Process

The finishing composition of the present invention may be applied to the fabric in accordance with any of the conventional "pre-cure" and "post-cure" techniques known in the art. In one embodiment, the treatment composition may be applied to the fabric by saturating the fabric in a trough and squeezing the saturated fabric through pressure rollers to achieve a uniform application (padding process). Herein "wet pick-up" refers to the amount of treatment composition applied to and/or absorbed into the fabric based on the original weight of the fabric.

"Original weight of the fabric" or simply "weight of the fabric" refers to the weight of the fabric prior to its contact with the treatment composition. For example, 50% pick-up means that the fabric picks up an amount of treatment solution equal to about 50% of the fabric's original weight. Preferably the wet pick-up is at least about 20%, preferably from about 50% to 100%, more preferably from about 65% to about 80%, by weight of the fabric.

Other application techniques that may be employed include kiss roll application, engraved roll application, printing, foam finishing, vacuum extraction, spray application or any process known in the art. Generally theses techniques provide lower wet pick-up than the padding process. The concentration of the chemicals in the solution may be adjusted to provide the desired amount of chemicals on the original weight of the fabric (OWF).

In a preferred embodiment, the composition is applied in an amount to insure a moisture content of more than about 10% by weight, preferably more than about 30% by weight, on the fabric before curing.

Preferably, the treated textile is dried at a temperature of from about 40° C. to about 130° C., more preferably of from about 60° C. and 85° C.

A. Pre-Cure

In one embodiment, textiles of the present invention are obtained via a pre-cure process. That is, once the composition has been applied to the fabric, the fabric is typically dried and then heated for a time and at a temperature (i.e., cured) sufficient for the cross-linking of the natural fibers with the cross-linking agent. For example, the fabric may be heated (cured) at a temperature greater than about 130° C., preferably from about 150° C. to about 220° C., in an oven for a period of from about 0.1 to about 15 minutes, more preferably from about 0.1 to about 5 minutes, more preferably from about 0.5 minutes to about 5 minutes, more preferably from about 0.5 to about 3 minutes, more preferably from about 1 minute to about 3 minutes, to provide durable press and/or shrinkage resistance effects. There is an inverse relationship between curing temperature and curing time, that is, the higher the temperature of curing, the shorter the dwell time in the oven; conversely, the lower the curing temperature, the longer the dwell time in the oven.

B. Post-Cure

In another embodiment, textiles of the current invention are obtained via a post-cure process. That is, once the composition has been applied to the fabric, the fabric is dried and then made into a garment or other article, which is then optionally pressed and cured. For example, the fabric may be dried at a temperature greater than about 30° C., preferably from about 70° C. to 120° C., in an oven for a period of from about 0.1 to about 15 minutes, more preferably from about 0.1 to about 5 minutes, more preferably from about 0.5 to about 5 minutes, more preferably from about 0.5 to about 3 minutes. The dried fabric is then cut and sewn, made into a garment and pressed according to known methods to those skilled in the art. The pressed garment may be cured by placing it in the oven and heating it at a temperature greater than about 130° C., preferably from about 150° C. to about 220° C., in an oven for a period of from about 0.1 to about 30 minutes, preferably from about 0.5 to about 15 minutes, to provide durable press and/or shrinkage resistance effects.

C. Post-Garment Treatment

In another embodiment, the fabric is first cut and sewn, made into a garment, and then the composition is applied using garment-dip techniques or any process known in the art, and subsequently cured.

D. Textile Pre-treatment

Prior to treatment with the composition, the fabric may optionally be prepared using any fiber, yarn, or textile pre-treatment preparation techniques known in the art. Suitable preparation techniques include brushing, singeing, desizing, scouring, mercerizing, and bleaching. For example, fabric may be treated by brushing which refers to the use of mechanical means for raising surface fibers that will be removed during singeing. The fabric may then be singed using a flame to burn away fibers and fuzz protruding from the fabric surface. Textiles may be de-sized, which refers to the removal of sizing chemicals such as starch and/or polyvinyl alcohol, which are put on yarns prior to weaving to protect individual yarns. The fabrics may be scoured, which refers to the process of removing natural impurities such as oils, fats and waxes and synthetic impurities such as mill grease from fabrics. Mercerization refers to the application of high concentrations of sodium hydroxide (or optionally liquid ammonia) and optionally high temperatures, steam, and tension to a fabric to alter the morphology of fibers, particularly cotton fibers. Fabrics may be mercerized to improve fabric stability, moisture retention and uptake, chemical reactivity, tensile strength, dye affinity, smoothness, and luster. Fabrics may also be compressively stabilized (e.g., SANFORIZED®) by manipulation/compaction of the fabric in the presence of heat and steam. Finally, bleaching refers to the process of destroying any natural color bodies within the natural fiber. A typical bleaching agent is hydrogen peroxide.

E. Post-Washing

After treatment, fabrics may optionally be washed to remove residual materials or to apply additional technologies/treatments to the fabric. Post-washing of finished fabric may occur before or after construction of a garment (i.e., end-product). Washing may occur via continuous or batch processes. Preferred washing mixtures are aqueous solutions with a pH from about 2 to about 13, preferably from about 6 to about 9; and a temperature from about 10 to about 120° C. In one embodiment, surfactants can be added to the post-wash mixture to improve removal of residuals of finished fabrics. In another embodiment, textile auxiliaries described herein can be added to the post-wash mixture to other deliver benefits to fabrics. Following the post-washing process, fabrics are dried.

F. Durable Press Resin

In another embodiment, the process of the present invention further includes the post-addition of a conventional durable press resin capable of imparting wrinkle-resistance to cellulose-containing textiles; or, alternatively, the textile finishing composition employed in the textile finishing process further includes such a durable press resin. Durable press resins (a.k.a., aminoplast resins), which are useful in the present invention, are well known in the art (see, e.g., U.S. Pat. No. 4,300,898 for examples and background). Non-limiting examples of aminoplast resins are the urea formaldehydes, e.g., propylene urea formaldehyde, and dimethylol urea formaldehyde; melamine formaldehyde, e.g., tetramethylol melamines, and pentamethylol melamines; ethylene ureas, e.g., dimethylol ethylene urea, dihydroxy dimethylol ethylene urea (DMDHEU), ethylene urea formaldehyde, hydroxy ethylene urea formaldehyde; carbamates, e.g., alkyl carbamate formaldehydes; formaldehyde-acrolein condensation products; formaldehyde-acetone condensation products; alkylol amides, e.g., methylol formamide, methylol acetamide; acrylamides, e.g., N-methylol acrylamide, N-methylol methacrylamide, N-methylol-N-methacrylamide, N-methylmethylol acrylamide, N-methylol methylene-bis(acrylamide), methylene-bis(N-methylol acrylamide); chloroethylene acrylamides; diureas, e.g., trimethylol acetylene diurea, tetramethylol-acetylene diurea; triazones, e.g., dimethylol-N-ethyl triazone, N,N'-ethylene-bis dimethylol triazone, halotriazones; haloacetamides, e.g., N-methylol-N-methylchloroacetamide; urons, e.g., dimethylol uron, dihydroxy dimethylol uron; and the like. In a preferred embodiment, the durable press resin is applied to a fabric previously treated and cured with a polymaleate finish (i.e., pre-cured) of the present invention. The resin application is expected to increased durable press benefits and/or facilitate production durable creases to a fabric or garment.

VII. Benefits

The finishing composition of the present invention provides superior properties and benefits for durable press and tensile strength retention. It is this unique combination of properties that has been previously unknown in formaldehyde free finishing.

A. Durable Press

"Durable Press" relates to the property of fabric to retain a shape, for example, a crease in pants or trousers, and not to manifest wrinkles. Durable Press is determined by applying American Association of Textile Chemists and Colorists (AATCC) Method 124-1996. The Durable Press benefit is defined as fabric having a durable press (DP) rating of at least about 3.0 after 1 washing and preferably at least about 3.0 after 5 washings. For the purposes of the present invention term "washing" or "laundering" relates to treating the substrate with an aqueous solution composition comprising at least about 0.001% by weight, of a detersive surfactant. The washing can be done manually or by appliance (e.g., machine washing).

The present invention preferably delivers a DP rating of at least about 3.5 after 1 machine wash, more preferably a DP rating of at least about 3.5 after 5 machine washings.

B. Tensile Strength Retention

Tensile strength retention (TSR) relates to the property by which a cellulosic-based textile maintains its ability to resist breaking when subjected to a longitudinal force. Tensile strength (TS) is measured according to procedures defined by ASTM Standard D 5093-90 wherein the force required to rupture a 1"×6" fabric is determined. Retention of tensile strength is calculated as a percentage of the tensile strength of a substrate of interest (e.g., durable press finished textile) relative to the tensile strength of a control substrate (e.g., unfinished textile). I.e., Tensile Strength Retention=[(Substrate TS)/(Reference Substrate TS)]×100%

A tensile strength retention benefit is defined as a statistically significant improvement in TSR of a durable press finished cellulosic based substrate in comparison to an identical cellulosic based substrate that is durable press finished by commonly used finishing agents such as DMDHEU (N,N-dimethylol-4,5-dihydroxyethylene urea) and related urea-formaldehyde resins, and formaldehyde. Improvements in TSR are preferably measured under conditions where the cellulosic substrate is identical and the level of all durable press finishing agent is such to impart DP values that are equivalent. TSR values are highly dependent on the substrate (e.g., level of cellulosic in substrate, type of cellulosic fiber, pre-treatment of substrate, woven or non-woven structure, knit structure), the level of durable press treatment applied to the substrate, and the process conditions used to deliver the durable press treatment to the fabric.

The textile fabrics finished with the compositions of the present invention show a tensile strength retention of at least about 40%, more preferably at least about 50%, more preferably at least about 70% at a durable press rating of at least about 3.0.

C. Anti-shrinkage/Dimensional Stability

Anti-shrinkage relates to the property of fabric not to contract and therefore provide a substrate with reduced dimensions. Shrinkage is determined by applying American Association of Textile Chemists and Colorists (AATCC) Method 135-1995 or Method 150-1995. The Anti-shrinkage benefit is defined as fabric having an Anti-shrinkage Rating (SR) of less than about 10% after 1 washing. Preferably, the present invention involves a rating of less than about 5% after 1 machine washing preferably less than about 4% or 3% after 1 washing, more preferably less than 1% after a single washing. More preferably, the finished textiles of the present invention provide a SR rating of less than 10%, preferably less than about 5%, more preferably less than about 4% or 3%, more preferably less than about 1% after at least 5 machine washings.

In addition, to these aforementioned benefits, textiles finished in compositions of the present invention deliver superior results in other benefits areas as well. Tear strength retention, hand feel, anti-abrasion/abrasion resistance, whiteness appearance and durable crease retention.

D. Tear Strength Retention

Tear strength (TRS) relates to the property by which a cellulosic substrate or textile resists further rupture when a lateral (sideways) pulling force is applied to a cut or hole in the fabric. Tear strength (TRS) is measured according to procedures defined by ASTM Standard D 2261 wherein the average force required to sever the five strongest yarns in the fabric is determined. Retention of tear strength (RTS) is calculated as a percentage of the tear strength of a substrate of interest (e.g., durable press finished textile) relative to the tear strength of a control substrate (e.g., unfinished textile). I.e., Retention of Tear Strength (RTS)=[(Substrate TRS)/(Reference Substrate TRS)]×100%

A tear strength retention (RTS) benefit is defined as a statistically significant improvement in RTS of a durable press finished cellulosic substrate in comparison to an identical cellulosic substrate that is durable press finished by commonly used finishing agents such as DMDHEU (N,N-dimethylol-4,5-dihydroxyethylene urea) and related urea-formaldehyde resins, and formaldehyde. Improvements in RTS must be measured under conditions where the cellulosic substrate is identical and the level of all durable press finishing agent is such to impart DP values that are equivalent. RTS values are highly dependent on the substrate (e.g., level of cellulosic in substrate, type of cellulosic fiber, pre-treatment of substrate, woven or non-woven structure, knit structure), the level of durable press treatment applied to the substrate, other surface coating additives on the fabrics (e.g., lubricants), and the process conditions used to deliver the durable press treatment to the fabric.

The fabrics finished in the compositions of the present invention preferably show a tear strength retention of at least about 40%, more preferably at least about 50%, more preferably at least about 70%, at a durable press rating of at least about 3.0.

E. In-Wear Wrinkle Resistance

In-wear wrinkle resistance relates to the property of fabric to retain a shape, for example, a crease in pants or trousers, and not to manifest wrinkles as a garment is worn. In-wear wrinkle resistance is assessed by subjective grading (as defined by AATCC test method 143-1999) of textiles submitted to simulated in-wear conditions as defined by AATCC test method 128-1999 ("Wrinkle Recovery of Fabrics: Appearance Method"). The in-wear wrinkle resistance benefit for the present invention is defined as fabric having a durable press (DP) rating of at least about 3.0 after 1 washing and preferably the same after 5. In preferred embodiments, the present invention may provide a DP rating of at least about 3.5 after 1 machine wash and preferably the same after 5 machine washings.

F. Hand Feel

Hand feel relates to the smoothness or softness of fabric, which forms a substrate. Although intuitively a subjective parameter, there are nevertheless instruments which can provide softness measurements, as well as American Association of Textile Chemists and Colorists (AATCC) Methods, inter alia, EP-5, "Fabric Hand: Guidelines for the Subjective Evaluation of" to provide objective standards for evaluating Hand Feel. These guidelines include using various parts of the hand to touch, squeeze, rub, or otherwise handle treated fabric.

Included within the instrument measurements are the Kawabata Evaluation Instruments: tensile/shear tester, bending tester, compression tester, and surface friction tester. Also important is the KES-SE Friction Tester from which is obtained a coefficient of friction measurement, the Taber V-5 Stiffness Tester, and the TRI Softness Tester.

The units for measuring increased hand feel are dimensionless and depend upon the type of system employed. For textiles treated with the compositions of the present invention, no change in hand feel from the untreated fabric is considered according to the present invention to be providing a benefit, since treatment of fabric typically reduces the quality of hand feel.

G. Anti-Abrasion/Abrasion Resistance

Anti-abrasion is a benefit, which is a "retained" benefit and as such is not measured against an untreated substrate. Treatment of a fabric fiber comprising substrate in a process will typically degrade the natural strength present in the substrate. Therefore, the present system measures the criteria of anti-abrasion relative to a prior art process, typically, treatment of a substrate with formaldehyde alone. The loss of anti-abrasion properties of the present invention is less than that found after treatment with formaldehyde.

Anti-abrasion properties relate to substrates wherein the fabric that forms the textile comprises fibers, which have reduced mechanical breakage or fracture thereby having a reduced "roughness" or "abrasive" feel. The level of Anti-Abrasion, as it relates to the present invention, is determined by the Nu-Martindale Abrasion Tester (Martindale). The parameters measures by the Martindale method include fiber weight loss and number of cycles to induce fabric hole formation. For the purposes of the present invention, the control for anti-abrasion is treatment of fabric with a like concentration of formaldehyde only solution under the same application, curing and drying conditions.

H. Anti-Yellowing/Whiteness Appearance

Anti-yellowing/whiteness relates to the property of a substrate not to loose it's color or hue due to the change in optical properties of the fabric. The following is a non-limiting example of a procedure for determining the whiteness effect of the finished textiles of the present invention.

Whiteness effect can be determined by any suitable means, for example, American Association of Textile Chemists and Colorists (AATCC) Method 110-1995 which measures the whiteness and tint of textiles. For the purposes of the present invention a change in CIE (Commission Internationale de l'Eclairage) value of 2 is considered to be a significant difference, a CIE change of 5 units is a profoundly different change. The anti-yellowing properties are typically determined relative to both untreated fabric and fabric that is treated with a cross-linking agent only, inter alia, formaldehyde.

Whiteness is associated with a region or volume in color space in which objects are recognized as white. The whitening effect, i.e. the yellowing-prevention effect, and/or safety effect of the present invention can also be evaluated by comparing the finished fabrics according to the present invention to both the untreated fabric and fabric that is finished with known cross-linking agents, e.g. DMDHEU and formaldehyde. The whiteness degree can be determined by both visual and instrumental grading. A team of expert panelists can visually determine the difference in whiteness between items treated with different finishes. Instrumentally, the assessment can be determined with the help of Colorimeters such as Datacolor® Spectraflash® SF 500, LabScan XE® instruments or others which are available for instance from HunterLab® or Gardner®. Whiteness appearance can be determined by any suitable means, for example, American Association of Textile Chemists and Colorists (AATCC) Method 110-1995 and ASTM Method E313 which measures the whiteness index of textiles. Whiteness index (WI) relates to the degree of departure of the substrate from a preferred white due to changes in optical properties. For the purposes of the present invention a change in WI value of 2 is considered to be a significant difference, a WI change of 5 units is a profoundly different change.

I. Colorfastness/Color Retention for Laundering

Colorfastness relates to the property by which a textile resists changes in any of its color characteristics, or transfer of its colorant(s) to adjacent materials, or both, as a result of the exposure of the material to any environment that might be encountered during the processing, testing, storage or use of the material. Colorfastness to laundering is evaluated according to AATCC Test Method 61-1996. A colorfastness benefit is defined as fabric maintaining a dE less than 3 after 1 launderings, preferably dE less than 5 after 10 launderings, more preferably a dE less than 5 after 25 washings. In preferred embodiments of the present invention, the finished textiles have a dE less than 1 after 1 laundering, preferably dE less than 3 after 10 launderings, more preferably a dE less than 3 after 25 washings.

J. Crocking

Crocking relates to the property by which a textile transfers a colorant(s) from the surface of a colored yarn or fabric to another surface or adjacent area of the same fabric principally by rubbing. Crocking is evaluated using according to AATCC Test Method 8-1996. A wet crocking benefit is defined as fabric crocking rating greater than 3 after 1 launderings, preferably greater than 3 after 10 launderings, more preferably a greater than 3 after 25 washings. A dry crocking benefit is defined as fabric crocking rating greater than 4 after 1 launderings, preferably greater than 4 after 10 launderings, more preferably a greater than 4 after 25 washings.

K. Durable Crease Retention

Durable crease retention relates to the property of a textile by which an inserted crease (defined as intentionally placed bend in a substrate) maintains its appearance after repeated laundering cycles. Durable crease retention is evaluated using subjective grading according to AATCC Test Method 88C-1996 by which crease-containing fabrics are compared to standard crease models. A durable crease benefit is defined as fabric having a crease rating (CR) of at least about 3.0 after 1 laundering, preferably at least about 3.0 after 5 launderings. In preferred embodiments of the present invention, the finished textiles have a CR of at least about 3.5 after 1 laundering and preferably the same after 5 launderings.

L. Reduced Drying Time

Reduced drying time means a reduction in the ability of a fabric to retain water and, therefore, a reduction in the time required to dry a sample of a particular fabric as compared with an untreated sample of the fabric and/or as compared with a conventional aminoplast resin-treated sample of the fabric. An untreated sample of the fabric refers to a sample of the fabric that does not have any chemical finishing treatment thereon. In a preferred embodiment, the methods of the invention provide fabrics with drying times that are from about 10% to about 75% less than the drying times of untreated fabric. In another embodiment, the methods of the invention provide fabrics with drying times that are from about 5% to about 50% less than the drying times of conventional aminoplast resin-treated fabric.

EXAMPLES

The present invention will now be exemplified via the following non-limiting examples that one of ordinary skill in the art will recognize as merely providing illustration of the presently preferred embodiments of the invention.

Example 1

This example shows how to manufacture a polymaleate for use in the present invention. Maleic acid (55 g, 0.50 mol) is added to a 500 ml three-necked round-bottom flask fitted with a condenser, internal thermometer, magnetic stirrer, and addition funnel containing 45 ml of water. Sodium hydroxide (40 g, 0.50 mol, 50%) and sodium hypophosphite (24.6 g, 0.28 mol) are added to the reaction flask. The mixture is heated to 85° C. The reagents are treated with potassium persulfate (7.2 g, 0.27 mol) in four portions over 90 minutes. The mixture is heated for an additional 30 minutes. Hydrogen peroxide (41.4 g, 0.37 mol, 30%) is gradually added to the mixture over 3 h. Once addition is complete, the mixture is heated for 1 h at 100° C. The cooled mixture is isolated as a liquid.

Example 2

This example shows how to manufacture another polymaleate for use in the present invention. Example 1 is repeated by increasing the amount of sodium hypophosphite (295 g, 3.0 mol) used in the reaction mixture.

Example 3

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 0.06% tergitol TMN-6 wetting agent, and 62.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at 85° C. in a drying oven (Werner-Mathis). The dried fabric is "pre-cured" for 3 minutes at 180° C. in a curing oven. The resulting finished fabric was "post-washed" with an aqueous solution to remove residual salts from the finished fabric.

Example 4

A 100% cotton oxford fabric is passed through a treatment bath and saturated with the treatment bath solution composition. Example 3 is repeated with respect to the treatment bath composition and fabric drying step, however, the resulting dry fabric is "post-cured" for 2 minutes at about 180° C. while a crease was concomitantly applied to the fabric using a fabric press. The resulting finished fabric was "post-washed" with an aqueous solution to remove residual salts from the finished fabric.

Example 5

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 2% of a 35% solution of GE SM2112 silicone, 0.06% tergitol TMN-6 wetting agent, and 61.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at 85° C. in a drying oven (Werner-Mathis). The dried fabric is "pre-cured" for 3 minutes at 180° C. in a curing oven. The resulting finished fabric was "post-washed" with an aqueous solution to remove residual salts from the finished fabric.

Example 6

A 100% cotton oxford fabric is passed through a treatment bath and saturated with the treatment bath solution composition. Example 5 is repeated with respect to the treatment bath composition and fabric drying step, however, the resulting fabric is "post-cured" for 2 minutes at about 180° C. while a crease was concomitantly applied to the fabric using a fabric press. The resulting finished fabric was "post-washed" with an aqueous solution to remove residual salts from the finished fabric.

Example 7

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 1% of a 35% solution of a stain repellent fluoroacrylate (e.g, REPEARL F-35® available from Ashahi), 0.06% tergitol TMN-6 wetting agent, and 62.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at 85° C. in a drying oven (Werner-Mathis). The dried fabric is "pre-cured" for 3 minutes at 180° C. in a curing oven. The resulting finished fabric was "post-washed" with an aqueous solution to remove residual salts from the finished fabric.

Example 8

A 100% cotton oxford fabric is passed through a treatment bath and saturated with the treatment bath solution composition. Example 7 is repeated with respect to the treatment bath composition and fabric drying step, however, the resulting dry fabric is "post-cured" for 2 minutes at about 180° C. while a crease was concomitantly applied to the fabric using a fabric press. The resulting finished fabric was "post-washed" with an aqueous solution to remove residual salts from the finished fabric.

Example 9

A 50/50 cotton/polyester blend fabric is passed through a treatment bath and saturated with the treatment bath solution composition. Example 7 is repeated with respect to the treatment bath composition, drying, post-washing and pre-curing steps.

Example 10

A 100% cotton oxford fabric is passed through a treatment bath and saturated with the treatment bath solution composition. Example 7 is repeated with respect to the treatment bath composition and fabric drying step, however the resulting dry fabric is cut and sewn into the form of a garment, pressed to impart permanent fabric creases and pleats, and then the completed garment was post-cured at 180° C. for 2 minutes. The resulting finished fabric was "post-washed" with an aqueous solution to remove residual salts from the finished fabric.

Example 11

A 100% cotton, pique knit, cranberry colored fabric is passed through a treatment bath and saturated with the treatment bath solution using the "double dip, double nip" technique. The treatment bath contains an aqueous solution containing 28.38% of a 35% solution of oligomaleate, 4.96% sodium hypophosphate catalyst, 0.58% of a 52% solution of a dye fixative (Sandofix TP available from Clariant), 0.28% tergitol TMN-6 wetting agent, and 65.82% de-ionized water. The treatment bath solution is adjusted to a pH of 2.45–2.48. The saturated cotton fabric is passed through pressurized rollers (i.e., padder, Werner-Mathis HVF-500) at 2 barrs pressure and a rate of 1.5 meters/minute, resulting in a wet pick-up of 70.43% of treatment solution on the fabric. The fabric is dried for 2 minutes at about 85° C. in a drying oven (Werner-Mathis). Following the drying step, the fabric is "post-cured" in the oven for 3 minutes at about 180° C. The resulting finished fabric was "post-washed" with an aqueous solution to remove any residual salts from the finished fabric.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A textile finishing composition comprising an aqueous composition having i) at least one cross-linking agent and ii) a catalytic amount of an esterification catalyst, the cross-linking agent comprising at least one cross-linking adjunct selected from the group consisting of:

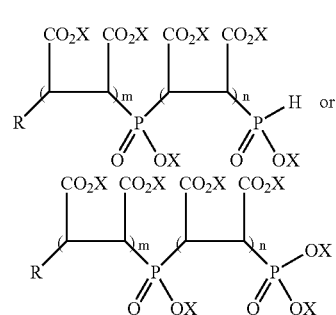

a)

where R is H, X is H or an alkali metal or alkaline earth metal, m is an integer of 1 or greater and n is an integer of 1 or greater;

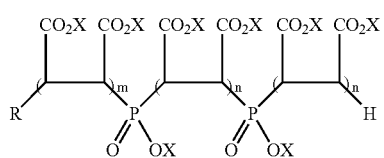

b)

where R is H, X is H or an alkali metal or alkaline earth metal, m is an integer of 1 or greater and n is an integer of 1 or greater;

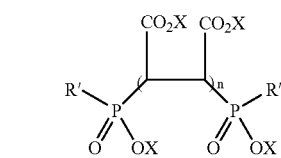

c)

where R' is H or OH, X is H or an alkali metal or alkaline earth metal and n is an integer of 1 or greater;

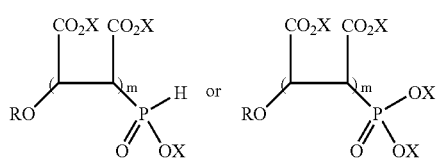

d)

where R is H or $SO_3X$, X is H or an alkali metal or alkaline earth metal, and m is an integer of 1 or greater;

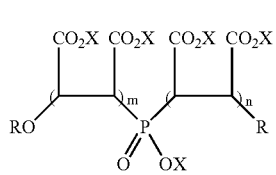

e)

where R is H or $SO_3X$, X is H or an alkali metal or alkaline earth metal, and m is an integer of 1 or greater and n is an integer of 1 or greater;

f) 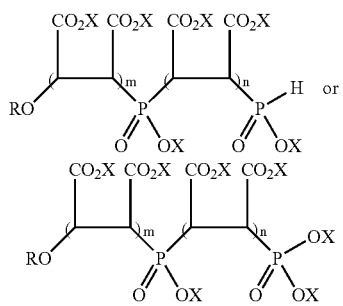

where R is H or SO$_3$X, X is H or an alkali metal or alkaline earth metal, m is an integer of 1 or greater and n is an integer of 1 or greater;

g) 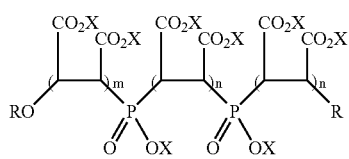

where R is H or SO$_3$X, X is H or an alkali metal or alkaline earth metal, m is an integer of 1 or greater and n is an integer of 1 or greater; and h) mixtures thereof.

2. The textile finishing composition of claim 1 wherein the crosslinking agent has an average molecular weight of less than about 2000.

3. The textile finishing composition of claim 1 wherein the composition is substantially free of color body forming transition metals.

4. The textile finishing composition of claim 3 wherein the composition has less than about 10 ppm of transition metals selected from the group consisting of iron, copper, manganese, cobalt and mixtures thereof.

5. The textile finishing composition of claim 4 wherein the composition has less than about 3 ppm of transition metals selected from the group consisting of iron, copper, manganese, cobalt and mixtures thereof.

6. The textile finishing composition of claim 1 wherein the composition further comprises an adjunct ingredient selected from the group consisting of wetting agents, softening agents, dye fixing agents, chlorine scavengers, stain repellency agents, anti-abrasion additives, antibacterial agents, hydrophilic finishes, brighteners, UV absorbing agents, fire retarding agents, and mixtures thereof.

7. The textile finishing composition of claim 6, wherein the softening agent is selected from the group consisting of silicones, hydrocarbons, polydimethylsiloxanes, aminosilicones, silicone copolyols, fatty acids, quaternary ammonium fatty acid esters, quaternary ammonium fatty acid amides, fatty alcohols, fatty ethers, surfactants, and polyethers.

8. The textile finishing composition of claim 6 wherein the stain repellency agent is selected from the group consisting of fluoroacrylates, fluoroalcohols, fluoroethers, fluorosurfactants, and mixtures thereof.

9. The textile finishing composition of claim 1 wherein the esterification catalyst is selected from the group consisting of phosphorous oxyacids, carbodiimides, hydroxy acids, mineral acids and Lewis acids.

10. The textile finishing composition of claim 9 wherein the esterification catalyst is selected from the group consisting of cyanamide, dicyanamide, urea, dimethylurea, sodium hypophosphite, phosphorous acid, sodium phosphate and mixtures thereof.

11. The textile finishing composition of claim 1 wherein the cross-linking agent comprises at least about 20 molar % of the cross-linking adjunct.

12. The textile finishing composition of claim 1 wherein the composition further comprises an additional crosslinking agent selected from the group consisting of non-phosphorous containing polycarboxylic acids, carboxylic acids, and mixtures thereof.

13. A process for finishing a textile article, comprising the steps of:
a) treating a non-finished textile component in an aqueous finishing bath containing a cross-linking composition, the cross-linking composition comprising an aqueous composition having i) at least one cross-linking agent and ii) a catalytic amount of an esterification catalyst, the cross-linking agent comprising at least one cross-linking adjunct selected from the group consisting of:

i) 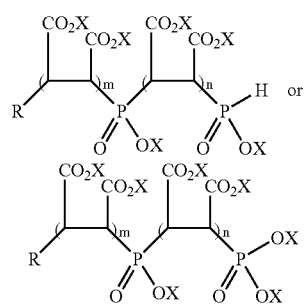

where R is H, X is H or an alkali metal or alkaline earth metal, m is an integer of 1 or greater and n is an integer of 1 or greater;

ii) 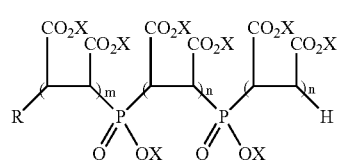

where R is H, X is H or an alkali metal or alkaline earth metal, m is an integer of 1 or greater and n is an integer of 1 or greater;

iii) 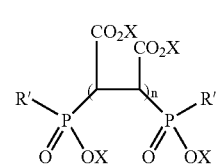

where R' is H or OH, X is H or an alkali metal or alkaline earth metal and n is an integer of 1 or greater;

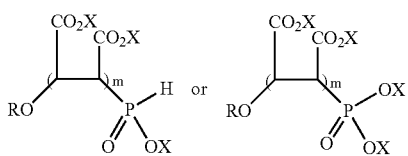

iv)

where R is H or $SO_3X$, X is H or an alkali metal or alkaline earth metal, and m is an integer of 1 or greater;

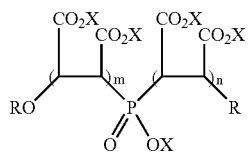

v)

where R is H or $SO_3X$, X is H or an alkali metal or alkaline earth metal, m is an integer of 1 or greater and n is an integer of 1 or greater;

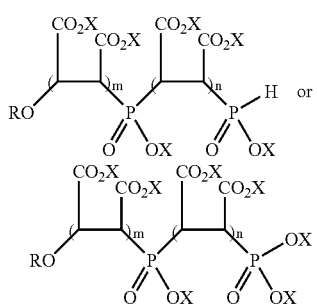

vi)

where R is H or $SO_3X$, X is H or an alkali metal or alkaline earth metal, m is an integer of 1 or greater and n is an integer of 1 or greater;

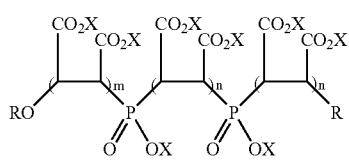

vii)

where R is H or $SO_3X$, X is H or an alkali metal or alkaline earth metal, m is an integer of 1 or greater and n is an integer of 1 or greater; and viii) mixtures thereof; and b) curing the treated textile to form a finished textile.

14. The process of claim 13 wherein the treated textile is dried at a temperature of about 40° C. to about 100° C.

15. The process of claim 13 wherein the curing step in conducted at a temperature of at least about 130° C.

16. The process of claim 13 wherein the textile is cured prior to being formed into a garment.

17. The process of claim 13, wherein the textile is cured after being formed into a garment.

18. The process of claim 13 wherein the aqueous finishing bath further comprises a durable press resin.

19. The process of claim 18 wherein the textile is cured before being formed into a garment.

20. A textile finishing bath comprising a cross-linking composition, the cross-linking composition comprising an aqueous composition having i) at least one cross-linking agent and ii) a catalytic amount of an esterification catalyst, the cross-linking agent comprising at least one cross-linking adjunct selected from the group consisting of:

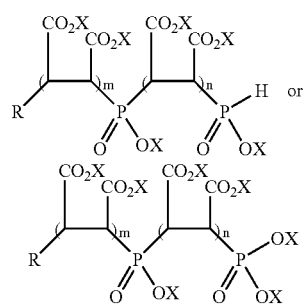

i)

where R is H, X is H or an alkali metal or alkaline earth metal, m is an integer of 1 or greater and n is an integer of 1 or greater;

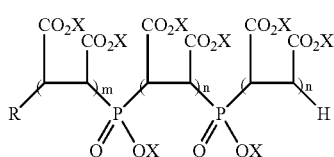

ii)

where R is H, X is H or an alkali metal or alkaline earth metal, m is an integer of 1 or greater and n is an integer of 1 or greater;

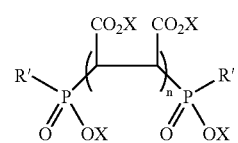

iii)

where R' is H or OH, X is H or an alkali metal or alkaline earth metal and n is an integer of 1 or greater;

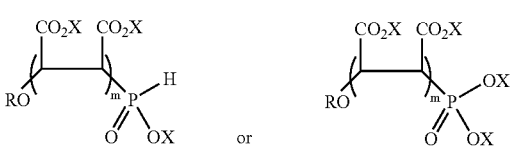

iv)

where R is H or $SO_3X$, X is H or an alkali metal or alkaline earth metal, and m is an integer of 1 or greater;

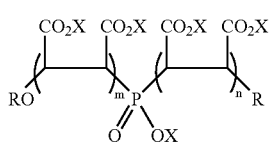

v)

where R is H or SO$_3$X, X is H or an alkali metal or alkaline earth metal, m is an integer of 1 or greater and n is an integer of 1 or greater;

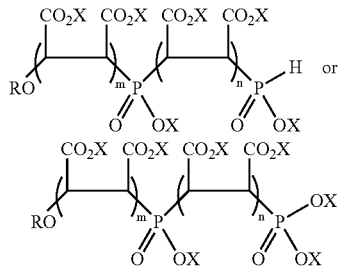

vi)

where R is H or SO$_3$X, X is H or an alkali metal or alkaline earth metal, m is an integer of 1 or greater and n is an integer of 1 or greater;

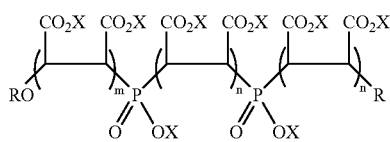

vii)

where R is H or SO$_3$X, X is H or an alkali metal or alkaline earth metal, m is an integer of 1 or greater and n is an integer of 1 or greater; and viii) mixtures thereof; and wherein the finishing bath further comprises 1,2,3,4-butanetetracarboxylic acid (BTCA) and wherein the BTCA accounts for from about 0.1 to about 75% of the total cross-linking agent in the finishing bath.

21. A process for finishing a textile article, comprising the steps of:

a) treating a non-finished textile component in an aqueous finishing bath containing a cross-linking composition, the cross-linking composition comprising an aqueous composition having i) at least one cross-linking agent, and ii) a catalytic amount of an esterification catalyst, the cross-linking agent comprising 1,2,3,4-butanetetracarboxylic acid (BTCA), wherein the BTCA accounts for from about 0.1 to about 75% of the total cross-linking agent in the aqueous finishing bath, and at least one cross-linking adjunct selected from the group consisting of:

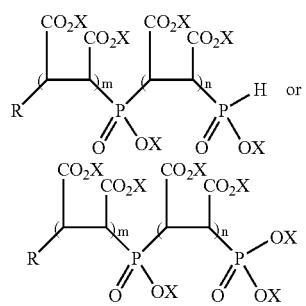

i)

where R is H, X is H or an alkali metal or alkaline earth metal, m is an integer of 1 or greater and n is an integer of 1 or greater;

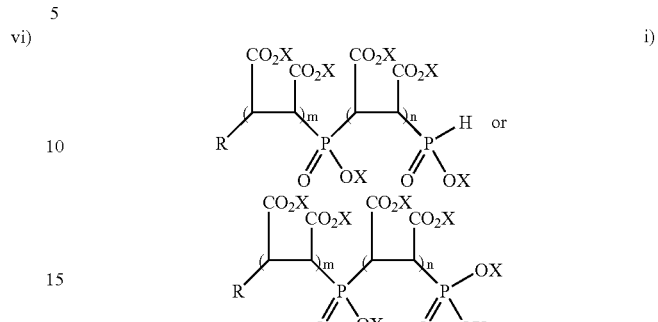

i)

where R is H, X is H or an alkali metal or alkaline earth metal, m is an integer of 1 or greater and n is an integer of 1 or greater;

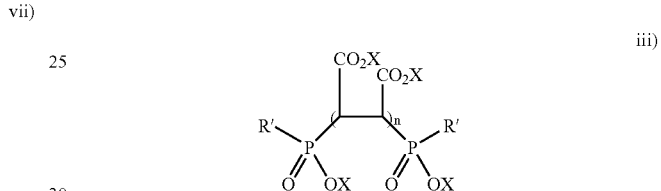

iii)

where R' is H or OH, X is H or an alkali metal or alkaline earth metal and n is an integer of 1 or greater;

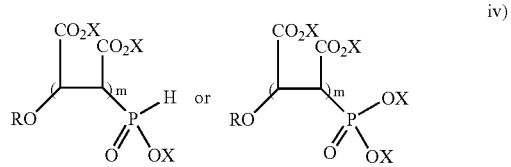

iv)

where R is H or SO$_3$X, X is H or an alkali metal or alkaline earth metal, and m is an integer of 1 or greater;

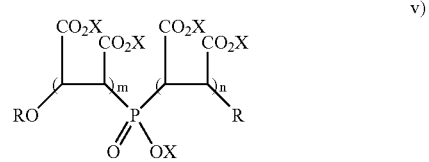

v)

where R is H or SO$_3$X, X is H or an alkali metal or alkaline earth metal, m is an integer of 1 or greater and n is an integer of 1 or greater;

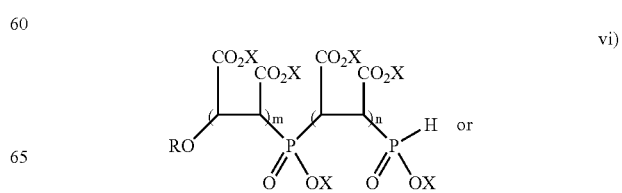

vi)

-continued

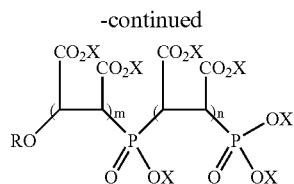

where R is H or $SO_3X$, X is H or an alkali metal or alkaline earth metal, m is an integer of 1 or greater and n is an integer of 1 or greater;

vii)

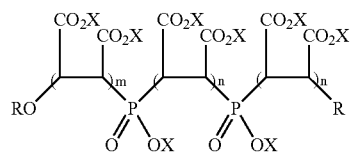

where R is H or $SO_3X$, X is H or an alkali metal or alkaline earth metal, m is an integer of 1 or greater and n is an integer of 1 or greater; and viii) mixtures thereof; and b) curing the treated textile to form a finished textile.

22. The textile finishing composition of claim 1, wherein the cross-linking adjunct comprises a) wherein m is 1 and n is 1, or f) wherein m is 1 and n is 1, or a mixture thereof.

23. The textile finishing composition of claim 22, wherein the cross-linking adjunct comprises the reaction product of maleic acid and sodium hypophosphite.

24. The process of claim 13, wherein the cross-linking adjunct comprises i) wherein m is 1 and n is 1, or vi) wherein m is 1 and n is 1, or a mixture thereof.

* * * * *